United States Patent [19]

Costanzi et al.

[11] Patent Number: 5,350,786
[45] Date of Patent: Sep. 27, 1994

[54] PROCESS OF (CO)POLYMERIZATION OF α-OLEFINES IN THE PRESENCE OF STABILIZERS

[75] Inventors: Silvestro Costanzi, San Giuliano Milanese; Damiano Gussoni, Milan; Luciano Pallini, Fornovo Taro, all of Italy

[73] Assignee: Enichem Synthesis S.p.A., Palermo, Italy

[21] Appl. No.: 26,097

[22] Filed: Mar. 4, 1993

Related U.S. Application Data

[63] Continuation of Ser. No. 803,739, Dec. 9, 1991, abandoned, which is a continuation of Ser. No. 532,112, Jun. 1, 1990, abandoned, which is a continuation of Ser. No. 78,663, Sep. 28, 1987, abandoned.

[30] Foreign Application Priority Data

Jun. 30, 1986 [IT] Italy .............................. 21312 A/86

[51] Int. Cl.$^5$ .......................................... C08K 5/3435
[52] U.S. Cl. ...................................... 524/102; 524/89; 524/92; 524/94; 524/96; 524/99; 524/718; 524/719; 524/720; 525/186; 526/260; 526/265
[58] Field of Search ................. 524/89, 92, 94, 96, 524/99, 102, 718, 719, 720; 525/186, 260; 526/265

[56] References Cited

U.S. PATENT DOCUMENTS

| | | | |
|---|---|---|---|
| 3,673,168 | 6/1972 | Burke, Jr. et al. | 526/265 |
| 3,947,526 | 3/1976 | Bacskai | 526/265 |
| 4,125,533 | 11/1978 | Murayama et al. | 524/102 |
| 4,294,949 | 10/1981 | Karrer | 526/265 |
| 4,325,864 | 4/1982 | Costanzi et al. | 524/104 |
| 4,346,188 | 8/1982 | Costanzi et al. | 524/104 |
| 4,413,076 | 11/1983 | Soma et al. | 524/102 |
| 4,413,096 | 11/1983 | Fu et al. | 526/265 |
| 4,415,689 | 11/1983 | Minagawa et al. | 524/102 |
| 4,692,485 | 9/1987 | Leistner et al. | 526/265 |

FOREIGN PATENT DOCUMENTS

| | | |
|---|---|---|
| 0092288 | 10/1983 | European Pat. Off. . |
| 0155055 | 9/1985 | European Pat. Off. . |
| 0162524 | 11/1985 | European Pat. Off. . |
| 0192987 | 9/1986 | European Pat. Off. . |
| 0248494 | 12/1987 | European Pat. Off. . |
| 1183059 | 10/1987 | Italy . |
| 1187724 | 12/1987 | Italy . |
| 1190367 | 2/1988 | Italy . |

OTHER PUBLICATIONS

Research Disclosure, No. 112, Aug. 1973, pp. 85-91 Ciba-Geigy "Combinations of Stabilizers for Polyolefins".

*Primary Examiner*—Kriellion S. Morgan
*Attorney, Agent, or Firm*—Stevens, Davis, Miller & Mosher

[57] ABSTRACT

Stabilizers for organic polymers, consisting of one or more compounds of the classis of the sterically hindered amines (HALS) are directly added to the reaction mixture during the (co)polymerization of the α-olefins or of their mixtures with other unsaturated monomers.

The so-obtained polymeric compositions result perfectly stabilized and show a thermo- and photo-oxidative resistance higher than that of the same polymeric compositions to which the same stabilizers are added by a traditional route.

14 Claims, No Drawings

PROCESS OF (CO)POLYMERIZATION OF α-OLEFINES IN THE PRESENCE OF STABILIZERS

This application is a continuation of application Ser. No. 803,739, filed Dec. 9, 1991 now abandoned, which is a continuation of application Ser. No. 532,112, filed Jun. 1, 1990 now abandoned, which is a continuation of application Ser. No. 078,663 filed Jul. 28, 1987 now abandoned.

The present invention relates to a new process for the homo- or copolymerization of α-olefins, wherein suitable stabilizer compounds, belonging to the family of the sterically hindered amines (HALS) are directly added to the reaction mixture during the course of the polymerization.

It is known that the organic polymers, such as, e.g., the polyolefins, undergo degradation with time, due to the exposure to the atmospheric agents, and, in particular, to the U.V. light, as well as thermo-oxidative degradations during their processing and transformation processes.

This degradation appears as a decrease in the physical characteristics of the polymers, such as, e.g., a decrease in ultimate tensile strength and a decrease in flexibility, which are accompanied by a change in melt flow index, or in melt flow time of the same polymers, or by a change in the appearance of the manufactured article.

For the purpose of counteracting such a degradation, it is customary in the art to introduce into the organic polymers small amounts of antioxidant compounds, generally constituted by sterically hindered phenols, sterically hindered amines, benzotriazoles, as well as phosphorus-containing compounds, and their various mixtures.

The difficulties which are met in the stabilization of the organic polymers derive essentially from phenomena of release of the stabilizer by the polymer.

These phenomena occur always, to a greater or lesser extent, when the traditional stabilizer compounds are used, but, above all, they can be boosted by the modalities according to which the same antioxidants are added to the polymer.

Typical is the case of the suspension-produced polyolefins (polypropylene, polyethylene), wherein the stabilizer compound is added to the polymer at the end of the polymerization reaction, and before the extrusion and pelletizing steps.

In these cases, the stabilizer product is distributed on the outer surface of polymer particles. A better homogenization is generally obtained in these cases during the subsequent thermal treatments, such as, e.g., the extrusion in the molten state, or the processing by the manufacturer of finished or semi-finished articles, for producing such articles.

These thermal treatments are generally extremely detrimental for not-completely stabilized polymers, such as those obtained from the above-mentioned polymeric suspensions, and that, above all in case of propylene, whose instability to the thermal treatments is well-known.

Extremely dramatic is the case of polyolefins, in particular polypropylene, obtained with organo-metallic catalytic systems capable of supplying polymers in the form of granules or pellets, or anyway of particles having rather large dimensions, and which, should it be possible to adequately stabilize them, could be sold avoiding the steps of extrusion and pelletizing.

One should furthermore remember that the operations of milling, blending and re-compounding (extrusion and pelletizing) are generally very expensive, besides being detrimental for the properties of the polymers according to what previously said.

The present Applicant has now surprisingly found that the above problems can be overcome by using, as stabilizer agents, some compounds belonging to the class of the sterically hindered amines (HALS), and adding these compounds during the step of polymerization. In fact, these stabilizer agents have shown to be substantially chemically inert towards the catalytic systems generally used in the synthesis of the polyolefins, and can be hence directly added to the polymerization reactor.

By operating in the above shown way, an absorption of the stabilizer by the growing polymer granule is obtained, with said stabilizer being incorporated in a homogeneous and uniform way inside the particles of the produced polymer.

The advantages achieved by means of the new process wherein the stabilizer agent is added to the polymer during the step of polymerization are many: first of all, as it shall be exhaustively shown in the experimental part, that of supplying polymers which are considerably more stable than those to which the same amounts of the same antioxidants are added a posteriori, or by any other systems.

The higher stability is obviously due to the fact that the stabilizer agent added during the synthesis is an integrant part of the polymer, and results to be more evenly distributed throughout the same, and this is confirmed by the fact that the normal operations of post-treatment of the polymer, such as the washing to eliminate the catalytic residues, do not modify to a significant extent the concentration thereof inside said polymer.

Significant financial advantages which can be accomplished by means of the new method derive from the possible elimination of expensive equipment, such as the equipment for extrusion, milling and blending with the antioxidant powder, and no longer necessary due to such reasons as previously stated.

In front of the above, no contraindications to the use of the method claimed in the present patent application have been found.

In fact, the stabilizers used do not interfere with the catalyst, and do not modify the main characteristics of the polymers, such as, e.g., their molecular weights, and molecular weight distribution, their viscosity, their melting points, and so forth.

The stabilizer agents belonging to the class of the sterically hindered amines used in the process according to the present invention are furthermore compatible with most commercial antioxidants, which, if desired, can be hence later on added, to the end polymer.

The sterically hindered amines, besides being efficacious antioxidants, and acting as radical scavengers, are powerful stabilizers to light, and, in particular, to U.V. light.

The photo-stabilizers are chemical additives which are essential in order to secure a long life to the articles manufactured from the plastic materials exposed to U.V. light, in that they delay the photo-degradation phenomena.

Therefore, the object of the present patent application is a process of polymerization of α-olefins, in particular ethylene and propylene, or mixtures thereof with other unsaturated monomers, wherein a stabilizer agent, which is constituted by one or more derivatives of tetra-alkyl-morpholine and of tetra-alkyl-pyrrolidine, respectively containing the groups (I) and (II): (Alk=alkyl)

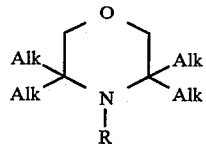 (I)

and

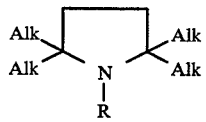 (II)

or by one or more derivatives of tetra-alkyl-piperidine containing the group (III)

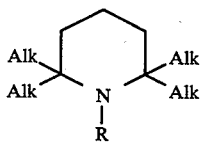 (III)

and substituted in their 4-position with a paraffinic polymeric chain of with a silyl-alkoxy group, is directly added to the reaction mixture during the same polymerization.

By the term "derivatives of tetra-alkyl-pyrrolidine", also those compounds are meant which have a different nomenclature, but which contain in their structure at least a tetra-alkyl-pyrrolidinic group (II), as, in particular, the dihydro-pyrrole-pyridinic derivatives, which have the general structure (IV)

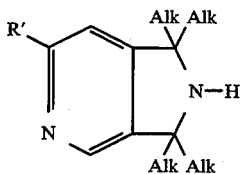 (IV)

the cyclo-octatrienic derivatives which have the structure (V)

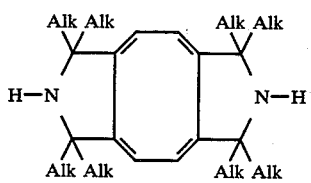 (V)

and the hexahydro-4,7-methane-1H-isoindol-8-onic derivatives (VI)

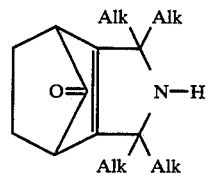 (VI)

with all of them being variously substituted.

More particularly, derivatives of tetra-alkyl-morpholine well usable in the process of the present invention are, compounds with the general formula:

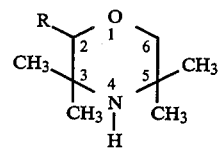

wherein R is hydrogen or methyl; bearing a substituent on the carbon atom in the position 2 and/or on the nitrogen atom in the position 4 of the ring.

Compounds with the general formula:

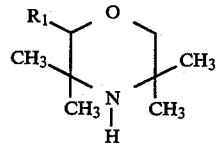

wherein: $R_1$ is a group selected among:

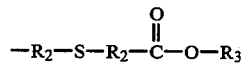

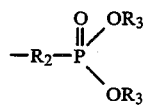

wherein: $R_2$ is a straight or branched alkylene radical containing from 1 to 4 carbon atoms ($C_1$-$C_4$); $R_3$ is a straight or branched alkyl radical containing from 1 to 20 carbon atoms ($C_1$-$C_{20}$). Compounds with the general formula:

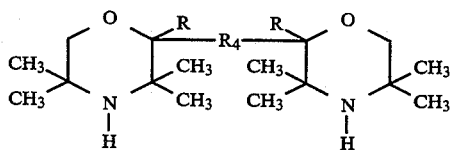

wherein: R is hydrogen or methyl;
$R_4$ is a group selected among:

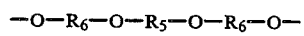

-continued

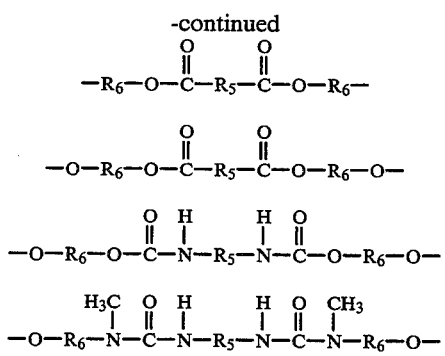

wherein: $R_5$ is a straight or branched $C_1$-$C_{10}$ alkylene group; the phenyl group; a phenyl group bearing one or more $C_1$-$C_4$ alkyl substituents; a cycloalkyl group; a cycloalkyl group bearing one or more $C_1$-$C_4$ alkyl substituents; a ($C_1$-$C_4$)-dialkylene group;
a ($C_1$-$C_4$)-dialkylene-cycloalkyl group;
$R_6$ is $C_1$-$C_4$ alkylene group.
Compounds with the general formula:

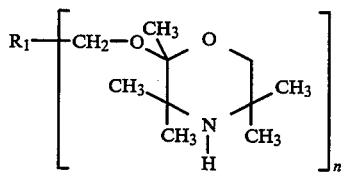

wherein: $R_7$ is a straight- or branched-chain $C_1$-$C_6$ aliphatic hydrocarbon residue; and n is an integer of value ranging from 1 to 4.

Compounds deriving from the homopolymerization of:

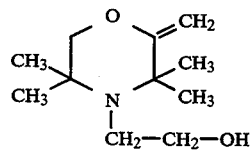

Compounds deriving from the reaction of:

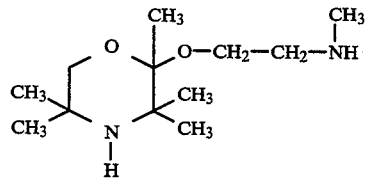

with symmetric trichlorotriazine and possibly also with a diamine, such as piperazine, ethylene diamine and hexamethylenediamine.
Compounds with the general formula:

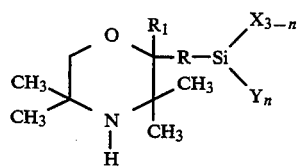

wherein

R' is hydrogen or methyl;
R is a linear or branched alkylene radical containing from 1 to 10 carbon atoms, or can be represented by

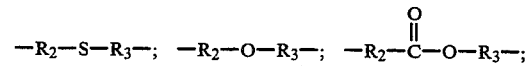

(where $R_2$ and $R_3$ are linear or branched alkylene radicals containing a total of between 2 and 10 carbon atoms);
X is a linear or branched alkylene radical containing from 1 to 5 carbon atoms;
Y is hydrogen, halogen, $C_1$-$C_4$ acyloxy, $C_1$-$C_4$ alkyloxy, amino, amino-oxy or silyloxy;
n is one, two or three.

Pyrrolidinic derivatives useful as polymeric stabilizers, and advantageously usable in the process of the present invention are
Compounds with the general formula:

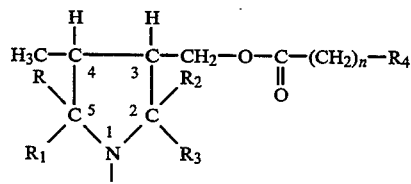

wherein:
R, $R_1$, $R_2$ and $R_3$ are alkyl radicals which can be the same, or different from each other,
$R_4$ can be hydrogen or an alkyl radical, or a carboxyester, the esterified group which contains the pyrrolidine ring, and
n is greater than or equal to zero, with the exception of the case in which $R_4$ is a hydrogen when n is greater than or equal to one.
Compounds with the general formula:

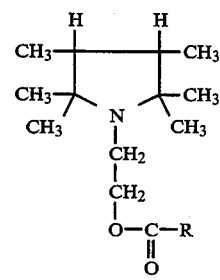

wherein R is the radical $C_nH_{2n+1}$, n having a value from 4 to 17.
The compounds with the general formula:

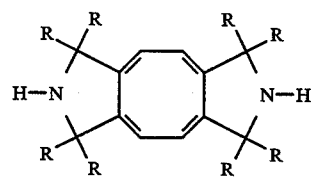

wherein:
R is an alkyl radical containing from 1 to 6 carbon atoms, or each couple of radicals R, considered together with the carbon atom directly bound to them, forms a cycloalkyl radical having from 3 to 6 carbon atoms in the ring.

6-Substituted 1,1,3,3,- tetramethyl-1-H-2,3-dihydropyrrolo-[3,4-c]-pyridines of general formula:

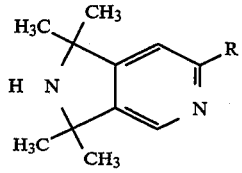

in which R can be an aryl containing up to 12 carbon atoms, CH$_2$R' where R' is an aryl of up to 12 carbon atoms or CH$_2$R" is an alkyl or aralkyl containing up to 20 carbon atoms, including branched, —OH, —NH$_2$ (including alkyl or acyl substituted), —CN or COOR$^{IV}$, where R$^{IV}$ is an alkyl containing up to 4 carbon atoms.

Stabilizers for organic polymers having the following compounds with the general formulas:

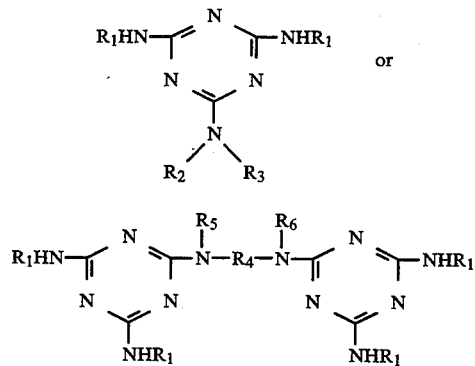

wherein

R$_1$ is: 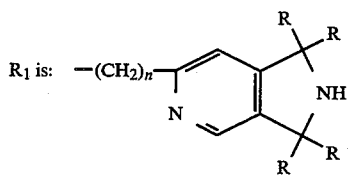

R being a straight or branched alkyl group, having from 1 to 6 carbon atoms, or each couple of radicals R, considered together with the carbon atom directly bound to them, forming a cycloalkyl radical having from 3 to 6 carbon atoms in the ring; and n being an integer from 2 to 10;

R$_2$ is a hydrogen atom, or a straight or branched alkyl group having from 1 to 18 carbon atoms, or a cycloaliphatic group;

R$_3$ is a straight or branched alkyl group having from 1 to 18 carbon atoms or a cycloaliphatic group; or when R$_2$ is a hydrogen, has the same meaning of R$_1$; or R$_1$ and R$_2$ considered together with the nitrogen connecting them, form a heterocyclic radical having from 3 to 6 atom and from 1 to 3 heteroatoms;

R$_4$ is methylene group —(CH$_2$)—$_m$, m being an integer varying from 2 to 18;

R$_5$ and R$_6$ are, independently, a hydrogen atom, or a straight or branched alkyl group having from 1 to 18 carbon atoms; or the group

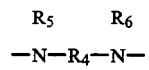

is a bivalent radical of an heterocyclic compound having from 6 to 8 carbon atoms, or can be substituted by the group

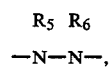

wherein R$_5$ and R$_6$ have the above mentioned meanings.

Derivatives of 1,1,3,3-tetraalkyl-2,3,4,5,6,7,-esahydro-4,7-methano-1H-isoindol-8-one having the following compounds with the general formula:

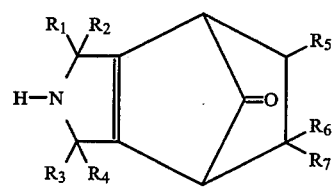

wherein

R is a hydrogen atom, or a C$_1$-C$_6$ alkyl group;

R$_1$, R$_2$, R$_3$ and R$_4$ are, independently, a C$_1$-C$_6$ alkyl group; or R$_1$+R$_2$ and R$_3$+R$_4$, considered together with the nitrogen connecting them, form a cycloalkyl radical having from 1 to 6 carbon atoms;

R$_5$ and R$_6$ are, independently, a hydrogen, or a C$_1$-C$_{12}$ alkyl group, or a phenyl, or a mono or disubstituted C$_1$-C$_{12}$ alkyl group or a mono or disubstituted phenyl;

R$_7$ is a hydrogen, or —CN; —COR$_8$; —CONH$_2$; —CONHR$_8$; —CON(R$_8$)$_2$; —CH=CH$_2$; —CH=CHR$_8$; —CR$_8$=CH$_2$; —CH=C(R$_8$)$_2$ where R$_8$ is a C$_1$-C$_4$ alkyl radical.

Compounds with the general formula:

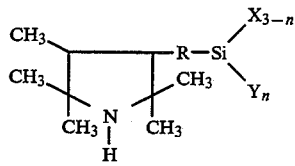

wherein

R is a linear or branched alkylene radical containing from 1 to 10 carbon atoms, or can be represented by

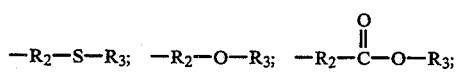

(where R$_2$ and R$_3$ are linear or branched alkylene radicals containing a total of between 2 and 10 carbon atoms);

X is a linear or branched alkylene radical containing from 1 to 5 carbon atoms;

Y is hydrogen, halogen, C$_1$-C$_4$ acyloxy, C$_1$-C$_4$ alkyloxy, amino, amino-oxy or silyloxy;

n is one, two or three.

Tetra-alkyl-piperidinic derivatives bearing, in their 4-position, a paraffinic polymeric chain are compounds definable by the formula:

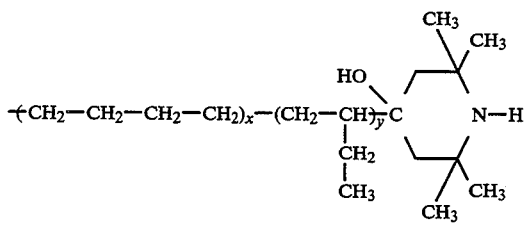

which can coexist with the form:

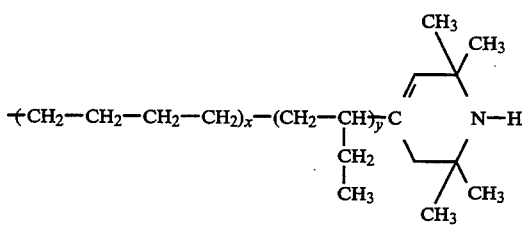

and/or with the hydrogenated form:

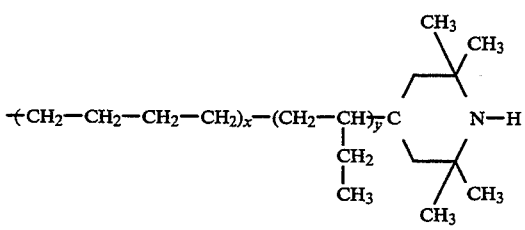

wherein x and y represent the hydrogenated butadienic units respectively deriving from the 1,4- and 1,2- structures, such units being randomly distributed along the polymeric chain, it being furthermore possible to bind the pyperidinic function to the 1,4-butadienic function rather than to the 1,2-butadienic function, as shown in the above formulae. Tetra-alkyl-piperidinic derivatives bearing in their 4-position a silyl-alkoxy group may be defined as compounds of the general formula:

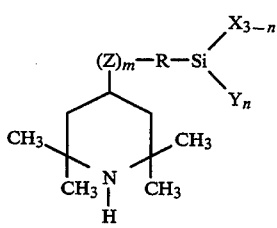

wherein
m is zero or 1;
Z is a group chosen from:

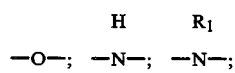

(where $R_1$ is a linear or branched alkyl radical containing from 1 to 5 carbon atoms);
R is a linear or branched alkylene radical containing from 1 to 10 carbon atoms, or can be represented by

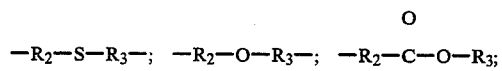

(where $R_2$ and $R_3$ are linear or branched alkylene radicals containing a total of between 2 and 10 carbon atoms);
X is a linear or branched alkylene radical containing from 1 to 5 carbon atoms;
Y is hydrogen, halogen, $C_1$-$C_4$ acyloxy, $C_1$-$C_4$ alkyloxy, amino, amino-oxy or silyloxy;
n is one, two or three.

Some of the compounds usable in the process of the present invention are commercial products; they are hence easily obtainable from the market.

The olefinic monomers which can be well polymerized and copolymerized according to the process of the present invention, in the presence of a stabilizer agent, are, e.g., ethylene, propylene, 1-butene, 4-methyl-1-pentene, 2-methyl-1-pentene, 1-pentene, 3-methyl-1-butene, 1-hexene, 1-octene, 2-ethyl-1-hexene, styrene, and so forth.

The stabilized polyolefins which are within the scope of the claims of the present invention are hence all those polyolefins which derive from the polymerization and co-polymerization according to the process of the present invention of the above-indicated monomers, as well as the products obtained from the mechanical blending of such polyolefins.

The process of polymerization of the α-olefins in the presence of a stabilizer agent according to the present invention can be carried out according to any of the most commonly used polymerization procedures, i.e., as a dispersion in an inert solvent, or as a dispersion in the same monomer, which, under the saturation pressure, is liquid.

When, according to the most advantageous method from an industrial viewpoint, the polymerization is carried out in the presence of an inert solvent, this shall be suitably selected from the aliphatic hydrocarbons, such as n-hexane, n-pentane, n-heptane, n-octane, iso-pentane, and so forth, the cyclic hydrocarbons, such as cyclohexene and cyclooctane, and the aromatic hydrocarbons, such as benzene or toluene.

The temperature and pressure conditions, under which the polymerization is to be carried out in the presence of the antioxidant, are those usable in the conventional polymerization processes. For example, the polymerization in the presence of an inert solvent can be advantageously carried out at a temperature comprised within the range of from 0° to 120° C., preferably of from 20° to 100° C., and under pressures comprised within the range of from the atmospheric value to 15 atmospheres, and preferably of from 1 to 10 atmospheres. If desired, molecular weight control agents can be used, as those skilled in the art know very well.

As relates to the catalysts usable in the process of the invention, these are the catalysts normally used in the synthesis of the polyolefins, and, in particular, those catalysts constituted by a compound of a transition metal of one of Groups IVA–VIII of the Periodic Table, e.g., titanium, vanadium, chrome, zirconium, together with an organic compound of a metal of one of Groups I–III (catalysts of Ziegler-Natta type) and the catalysts on the basis of metal oxides.

The classic example of a Ziegler-Natta catalytic system, which is also the catalytic system most widely used in the polymerization of the olefins, is constituted by an organic compound of aluminum, e.g., triethyl-aluminum, tri-isobutyl-aluminum, di-ethyl-aluminum chloride, isobutyl-aluminum dichloride, and so forth, and by titanium chlorides; in the preferred form, catalysts are used, in which the titanium chloride is reacted with a magnesium compound (magnesium oxide, hydroxide, chloride, alkoxides, or carboxylates), and, if desired, in the presence of an electron donor; this is then combined with an organic aluminum compound, as above seen.

As relates, on the contrary, to the catalysts based on metal oxides, the most used are the oxides of vanadium, molidenum and tungsten, supported on alumina, or on another inert oxide, activated by reduction with hydrogen, and chrome oxide on silica-alumina, activated by oxidation in air at high temperatures. However, from the patent literature, as well as from the general technical literature, other types of catalytic systems for the high-yield polymerization of olefins are known, and all of them can be used as well in the process of the invention. The addition of the stabilizer compound to the reaction mixture can be carried out at any time during the polymerization, from the beginning of the true polymerization step, up to the step of quenching of the catalyst used.

The amounts of antioxidant which are added to the reaction mixture are strictly depending on the polymer yields, on the polymer amount in the suspension or solution which leaves the reactor, and on the amount of stabilizer agent desired in the same polymer. The desired amount of stabilizer compound desired in the polyolefins produced is generally comprised within the range of from 0.005 to 1% by weight, and preferably of from 0.01 to 0.5%.

The amount of stabilizer compound to be used in the process of the invention in order to obtain a polymer containing the desired percentage of stabilizer compound, can be easily computed for each polymerization, if the percentage of solvent contained in the wet polymer outcoming from said polymerization is known, and then suitably adjusting the concentration of the stabilizer compound in the reaction dispersant.

The following examples are furthermore illustrative of the process of the present invention, but they should not be understood as being limitative of the scope of said invention.

EXAMPLE 1

High-Density Polymerization of Ethylene with High-Yield Catalysts

To an autoclave of 5 liters of capacity, equipped with a magnetic anchor stirrer, thermometer and pressure gauge, 2 liters (1,360 g) of anhydrous and de-aerated heptane, and 8 mmol of aluminum-tri-isobutyl are charged in the absence of air and moisture.

The temperature is increased to 85° C., then 2 kg/cm$^2$ of H$_2$, 50 ml of a heptanic suspension containing 12 mg of a catalyst for the polymerization of $\alpha$-olefins, obtained by reacting TiCl$_4$ with the product of the spray-drying of an ethanolic solution of MgCl$_2$—as disclosed in U.S. Pat. No. 4,377,491—and finally ethylene, are added, in the order mentioned, until a total pressure of 6 kg/cm$^2$ is reached.

Ethylene is continuously fed to the autoclave for approximately 2 hours, with pressure, temperature and stirring being kept constant.

At the end of the polymerization, 10 ml of ethyl alcohol is added, the reaction mixture is then cooled to room temperature and the autoclave is vented.

The contents of the autoclave are then discharged on a filter, and the solid retained by the filter is weighed (265 g) and is then dried in an oven at 60° C. and under 10 mm$_{Hg}$ for 2 hours.

At the end of the operation, 192 g is obtained of a dry polymer, having the following characteristics:

MFI$_{(2.16)}$ = 1.8 g/10 minutes;

Shear sensitivity (MFI$_{21.6}$/MFI$_{2.16}$) = 32.

EXAMPLE 2

Polyethylene Containing UV-1 Added During the Polymerization Step

The reaction is carried out as disclosed in the preceding Example, with the following modification:

when charging the autoclave, 8 mmol of aluminum-triisobutyl and 3 g of UV-1 dissolved in 50 ml of heptane are added.

This experimental additive is a siloxanic polymer corresponding to the formula:

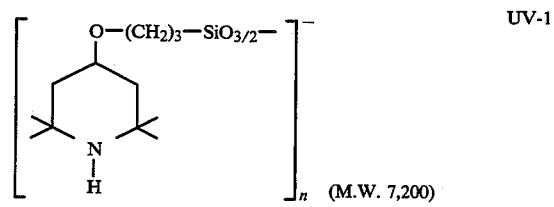

After the end of the operations of recovery, 100 g is obtained of a dry polymer having an MFI$_{2.16}$ of 5 g/10 minutes.

EXAMPLE 3

Polyethylene Containing UV-2 Added During the Polymerization Step

The reaction is carried out as reported in the preceding Example, using, in place of UV-1, the following product:

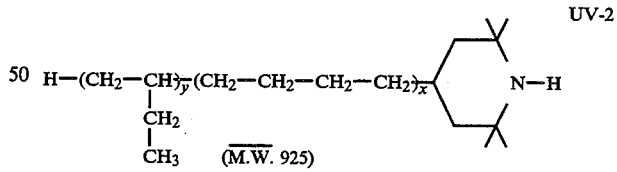

After the end of the operations of recovery, 115 g is obtained of a dry polymer, having an MFI$_{2.16}$ = 4.8 g/10 minutes.

Shear sensitivity = MFI$_{21.6}$/MFI$_{2.16}$ = 30.

A portion of the so-obtained polyethylene was submitted to an extraction in soxhlet, using CH$_2$Cl$_2$ as the solvent, in order to verify the amount of UV-2 contained in the polymer.

After the extraction, the solvent is removed and the residue is analyzed qualitatively and quantitatively.

The amount of UV-2 present in the residue is, then referred to 100 g of obtained polymer.

The original polymer contains 0.1% of UV-2.

EXAMPLE 4

Polyethylene Containing UV-1 Added During the End Step of the Polymerization Process The reaction is carried out according to as reported in Example 1 and furthermore, during the step of catalyst quenching, 20 ml of ethyl alcohol containing 3 g of UV-1 additive, is added.

At the end of the recovery operation, 192 g is obtained of a dry polymer, containing from about 0.08% of UV-1 additive, having the following characteristics:
$MFI_{2.16} = 1.6$ g/10 minutes;
$MFI_{21.6}/MFI_{2.16} = 34$.

EXAMPLE 5

Polyethylene Containing UV-2 Added During the End Step of the Synthesis Process The reaction is carried out according to as reported in preceding Example 4, using the product UV-2 in place of the experimental additive UV-1.

After the usual recovery operations, 200 g is obtained of a dry product, having
$MFI_{2.16} = 2.1$ g/10 minutes.

The polymer contains 0.12% of additive, determined as reported in Example 3.

EXAMPLE 6

Preparation of Polyethylene with Added UV-1

10 g of polymer obtained as disclosed in Example 1 is suspended in 100 ml of hexane; to this suspension, 10 ml of hexane containing 0.1 g of UV-1 additive is added.

The mixture is stirred for 15 minutes at room temperature, the solvent is then distilled off, firstly under atmospheric pressure, then under a pressure of 20 $mm_{Hg}$.

To the so-obtained powder, a further 90 g of polymer, obtained as disclosed in Example 1, is added, and the resulting powder is blended inside a dry-blend for 1 hour.

EXAMPLE 7

Preparation of Polyethylene with Added UV-2

The same preparation of Example 6 is repeated, using the product UV-2 in place of antioxidant UV-1.

EXAMPLE 8

The polymers obtained as disclosed in preceding Examples 1–7 were submitted to compression moulding, in order to obtain a slab of 1.5 mm of thickness.

To perform the compression moulding, a compression press of CARVER type was used, under the following conditions:
T(°C.) = 190
2 minutes of pre-heating
3 minutes of compression under a pressure P = 1,400 kg/cm²
cooling in water at 15° C.

The so-obtained slabs were submitted to accelerated ageing on a UV-CON equipment, manufactured by ATLAS, with alternating cycles of irradiation with fluorescent lamps, rich in U.V. light, at a wavelength comprised within the range of from 280 to 350 nm, and of condensation in the dark, at controlled temperatures.

The conditions used in these tests are the following:
Temperature of the black panel = 60° C.
Relative humidity = 50%

After various time periods of UV-CON exposure, the yellow indexes are measured and, finally, the irradiation time necessary to reach the loss of flexibility is determined.

The results of these tests are reported in following Table 1.

TABLE I

| Compound of Example No. | Yellow Index | | | | Times of Embrittlement (hours in) UVCON |
|---|---|---|---|---|---|
| | 0 (hours) | 500 (h) | 750 (h) | 1,000 (h) | |
| 1 | 2.1 | 7.40 | 18.4 | n.d. | 800 |
| 2 | 1.5 | 4.2 | 6.7 | 12.1 | 1,200 |
| 3 | 1.4 | 2 | 4.5 | 6.5 | 1,800 |
| 4 | 1.5 | 3.2 | 4.7 | 8 | 1,800 |
| 5 | 1.5 | 3.7 | 5.1 | 9.1 | 1,400 |
| 6 | 1.3 | 2.1 | 5.7 | 15.1 | 1,200 |
| 7 | 1.5 | 3.1 | 5.3 | 13.3 | 1,100 |

EXAMPLE 9

Preparation of an Ethylene-Butene-1 Copolymer

To an autoclave of 5 liters of capacity, equipped with a magnetic anchor stirrer, thermometer and pressure gauge, 2 liters (1,120 g) of anhydrous and de-aerated isobutene, and 8 mmol of aluminum-tri-isobutyl are charged in the absence of air and moisture.

The temperature is increased to 100° C., then 2 kg/cm² of $H_2$, 50 ml of an isobutanic suspension containing 12 mg of a catalyst for the polymerization of α-olefins, obtained as disclosed in Example 1, and finally a stream consisting of 1-butene and ethylene in 2/1 molar ratio are added, in the order mentioned, until a total pressure of 17 kg/cm² is reached.

The mixture of 1-butene and ethylene is continuously fed to the autoclave for approximately 3 hours, with pressure, temperature and stirring being kept constant.

At the end of the polymerization, 15 ml of ethyl alcohol is added, the reaction mixture is cooled to room temperature, the autoclave is vented, and the normal operations of recovery of the polymer are carried out.

After drying the polymer in oven at 60° C., for 2 hours under 20 $mm_{Hg}$, 220 g is obtained of a product having an $MFI_{2.16} = 6$.

EXAMPLE 10

Polymerization of an Ethylene Butene-1 Copolymer in the Presence of an Experimental Stabilizer UV-3

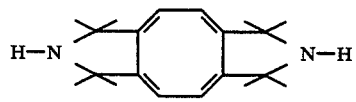

The experience is repeated as disclosed in preceding Example 9, but charging, together with 8 mmol of aluminum-triisobutyl, also 3 g of UV-3 product.

After the end of the operation, 216 g is obtained of a dry polymer, having an $MFI_{2.16} = 4$ g/10 minutes.

A portion of so-obtained polymer was submitted to an extraction in soxhlet, using $CH_2Cl_2$ as the extraction solvent. The solution was analysed qualitatively and quantitatively, in order to measure the amount of UV-3 additive contained in the polymer obtained: it contained 0.12% of (UV-3) polymer.

EXAMPLE 11

Polymerization of an Ethylene Butene-1 Copolymer Containing UV-3 Added During the End Step of the Synthesis Process The reaction is carried out according to as reported in preceding Example 9, but, during the step of catalyst quenching, 20 ml of ethyl alcohol containing 3 g of UV-3 additive were added.

At the end of the normal recovery operation, 222 g is obtained of a dry polymer, with an $MFI_{2.16} = 6.3$ g/10 minutes.

EXAMPLE 12

Polymerization of an Ethylene Butene-1 Copolymer Containing UV-4 Added During the Polymerization The reaction is carried out according to as reported in preceding Example 10, but using, in place of UV-3, the following product:

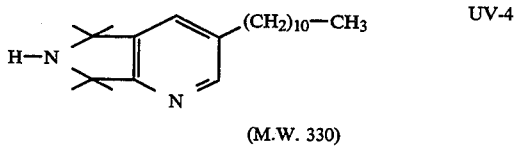

(M.W. 330)

EXAMPLE 13

Example analogous to preceding Example 11, using UV-1 during the step of catalyst quenching.

EXAMPLE 14

Addition of UV-1 Additive to LLDPE Powder Prepared as Reported in Example 9

To a flask of 100 ml of capacity, 50 ml of hexane, 10 g of polymer as prepared in Example 9 and 0.1 g of UV-1 are added.

The mixture is stirred for approximately 30 minutes, and the solvent is removed, firstly at room temperature, and then under vacuum at 60° C. (20 $mm_{Hg}$).

The so-obtained mixture is added to a further 90 g of polymer, and is stirred at room temperature for 2 hours inside a laboratory dry-blend.

EXAMPLE 15

Addition of UV-1 Additive to LLDPE Powder Prepared as Reported in Example 9

The addition is carried out as disclosed in Example 14, but operating with a double amount (0.2 g) of UV-1. The end polymer contains 0.2% by weight of UV-1.

EXAMPLE 16

Addition of UV-3 Additive to LLDPE Powder Prepared as Reported in Example 9

The addition is carried out as disclosed in Example 14, but using UV-3 in place of UV-1.
The end polymer contains 0.1% by weight of UV-3.

EXAMPLE 17

Addition of UV-4 Additive to LLDPE Powder Prepared as Reported in Example 9

The addition is carried out as disclosed in Example 14, but using UV-4, in an amount of 0.1% by weight, relatively to the polymer, in place of UV-1.

EXAMPLE 18

The polymers obtained as disclosed in Examples 9-17 were submitted to compression moulding, to obtain a film of 60 μm of thickness.

For this moulding, a laboratory-size press of CARVER type was used with the following operating modalities:

T(°C.) = 190
Pre-heating = 2 minutes
Moulding = 3 minutes under a pressure P = 1,400 kg/cm².

The so-obtained films were submitted to irradiation by U.V. light, using an UV-CON equipment (ATLAS) under the following conditions:
Black Panel Temperature = 60° C.
Relative Humidity = 50%

On the films, at various ageing times, the formation of carbonylic compounds was evaluated, by evidencing it by I.R. spectroscopy, and reported as the "carbonyl index", according to the following formula:

$$C.I. \text{ (Carbonyl Index)} = \frac{A_t - A_o}{D} \times 100$$

wherein:
$A_o$ = Initial intensity of absorption at 1,710 cm$^{-1}$;
$A_t$ = Intensity of absorption after the time t of exposure in UV-CON, and determined at 1,710 cm$^{-1}$;
D = Film thickness (μm).

The following Table II reports the exposure times in UV-CON, necessary for obtaining a percent change in carbonyl index equal to 10.

TABLE II

| Compound of Example No. | Exposure Time (hours) |
| --- | --- |
| 9 | 150 |
| 10 | 1,500 |
| 11 | 1,200 |
| 12 | 1,600 |
| 13 | 1,300 |
| 14 | 900 |
| 15 | 1,600 |
| 16 | 1,000 |
| 17 | 950 |

From Table II one can observe that:
a) The addition of a stabilizer during the polymerization (Examples 10 and 12) yields products which supply a better performance than the products obtained by adding the same percentages of stabilizer compound during the step of catalyst quenching.
b) The addition of the stabilizer during the end step of the synthesis process (Examples 11 and 13) is more efficacious than the addition thereof by the normal addition techniques (Examples 14 through 17).

EXAMPLE 19

Propylene Polymerization

To an autoclave of 5 liters of capacity, free from air and moisture, equipped with a thermocouple for temperature measurement, and with a magnetic-anchor stirrer, at the temperature of 70° C. 2 liters of heptane containing 13 mmol of AlEt₃, 3.6 mmol of methyl p-toluate, 200 mg of a catalyst for α-olefin polymerization, obtained as reported in Example 1, 500 N.C.-ml of H₂, and propylene are charged, up to the total pressure of 7 bars.

The addition of propylene is continued for 2 hours, with autoclave pressure and temperature being maintained constant.

At the end of the polymerization, 10 g is added of ethyl alcohol, the reaction mixture is then cooled to room temperature, the autoclave is vented and the contents thereof are discharged on a filter. The filtered solid, which weighs 420 g, is then dried in an oven at 0° C., under a residual pressure of 10 mm$_{Hg}$, for 2 hours.

Thus, 310 g is added of a solventless polymer, which has an MFI$_{2.16}$=2 g/10 minutes.

EXAMPLE 20

Polymerization of Polypropylene with the Addition of UV-1 During the Step of Catalyst Quenching The reaction is carried out according to as reported in the preceding Example; at the end of the polymerization, 20 ml of ethyl alcohol containing 3 g of UV-1 is added.

After a further (approximately) 30 minutes of stirring, the autoclave is vented and the product (410 g) is recovered as reported in the preceding Example.

After the oven-drying of the product, 310 g thereof is obtained.

EXAMPLE 21

Addition of UV-1 Product to the Polypropylene Powder Prepared as Reported in Example 19

UV-1 product is added to the polymer prepared as reported in Example 19, by operating as disclosed in Example 14 for LLPDE.

EXAMPLE 22

The polymers prepared as reported in Examples 19–21 were extruded in order to obtain films from flat die, of 50±5 μm of thickness.

For such extrusion, a laboratory-size extruder of BRABENDER type was used under the following conditions:

Temperature profile T(°C.)=210-230-240-220
Rpm=50

The so-obtained films were submitted to irradiation by U.V. light, using a WOM by ATLAS, with the following modalities:

Black panel temperature=55° C.
Relative humidity=50%
Full-light cycle.

On the films, the embrittlement time and the time necessary to obtain a residual elongation at break of 50% were determined.

The results are reported in following Table III.

TABLE III

| Compound of Example No. | Embrittlement Time | Time to 50% of Residual Elongation at Break |
|---|---|---|
| 19 | 70 (hours) | 50 (hours) |
| 20 | 400 (hours) | 350 (hours) |
| 21 | 300 (hours) | 250 (hours) |

We claim:

1. Process for the preparation of thermostabilized homopolymers of α-olefins or co-polymers of different α-olefins, consisting of polymerizing or co-polymerizing α-olefins to form polyolefins in the presence of at least a stabilizer agent selected from the derivatives of tetra-alkyl-morpholine and of tetra-alkyl-pyrrolidine, respectively containing the groups (I) and (II):

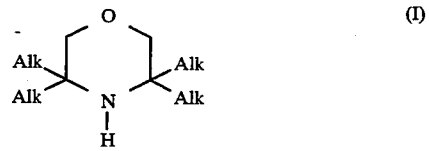

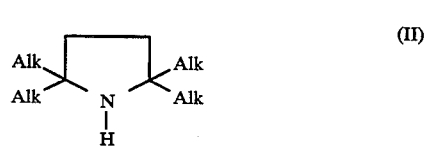

and the derivatives of tetra-alkyl-piperidine-containing the group (III)

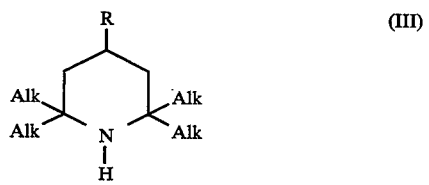

wherein R is a paraffinic polymeric chain, or a silyl-alkoxy group, said stabilizer agent not modifying the molecular weight, viscosity or melting point of said polyolefins formed by the polymerization.

2. Process for the preparation of thermostabilized homopolymers or α-olefins or co-polymers of different α-olefins, consisting of polymerizing or co-polymerizing α-olefins to form polyolefins in the presence of at least a stabilizer agent, said stabilizer agent being a derivative of tetra-alkyl-morpholine or of tetra-alkyl-pyrrolidine, respectively containing the groups (I) and (II)

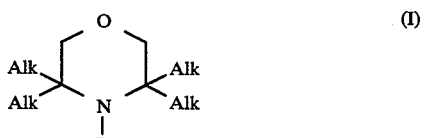

and

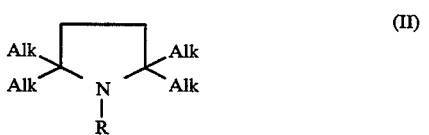

wherein R=H.

3. Process of claim 2, wherein the stabilizer agent is selected from the derivatives of tetra-alkyl-pyrrolidine, wherein one or more pyrrolidinic groups are condensed on an aliphatic or pyrridine ring.

4. Process for the preparation of thermostabilized homopolymers of α-olefins or co-polymers of different α-olefins, consisting of polymerizing or co-polymerizing α-olefins to form polyolefins in the presence of at least a stabilizer agent, said stabilizer agent being selected from the derivatives of tetra-alkyl-piperidine, substituted in 4-position with a paraffinic polymeric chain, or with a silyl-alkoxy group and not modifying the molecular weight, viscosity or melting point of said polyolefins formed by the polymerization.

5. Process of claim 4, wherein such stabilizer agent is selected from the derivatives of tetra-alkyl-piperidine having the formula:

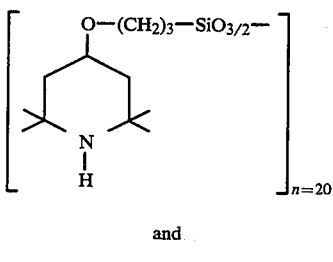

and

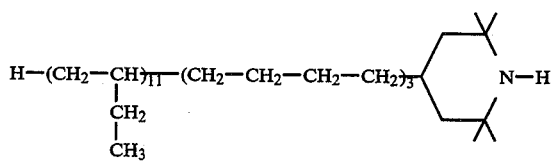

6. Process for the preparation of thermostabilized homopolymers of α-olefins or co-polymers of different α-olefins, consisting of polymerizing or co-polymerizing homopolymers of α-olefins to form polyolefins in the presence of at least a catalyst and a stabilizer agent selected from the derivatives of tetra-alkyl-morpholine and of tetra-alkyl-pyrrolidine, respectively containing the groups (I) and (II):

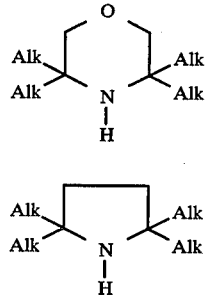

and the derivatives of tetra-alkyl-piperidine-containing the group (III)

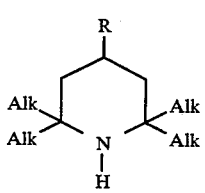

wherein R is a paraffinic polymer chain, or a silyl-alkoxy group.

7. Process of claim 6, wherein the catalyst is a catalyst of Ziegler-Natta type.

8. Process of claim 1, wherein the α-olefinic which is polymerized or co-polymerized is a monomer selected from ethylene, propylene, 1-butene, 4-methyl-1-pentene, 2-methyl-pentene, 1-pentene, 3-methyl-1-butene, 1-hexene, 1-octene, 2-ethyl-1-hexane, and styrene.

9. Process of claim 8, wherein the monomer is selected from ethylene and propylene.

10. Process of claim 1, wherein the polymerization is carried out in the presence of an inert solvent.

11. Process of claim 1, wherein the stabilizer agent is used in such an amount that the so-obtained polymer retains a percentage thereof, by weight of from 0.005 to 1%.

12. Process of claim 11, wherein such percentage is within the range of from 0.01 to 0.5.

13. Stabilized polyolefin obtained by means of the process of claim 1.

14. Process for the preparation of thermostabilized homopolymers of α-olefins, consisting, of polymerizing or co-polymerizing α-olefins to form polyolefins in the presence of at least a catalyst and a stabilizer agent and quenching said catalyst, said stabilizer agent being added during the step of catalyst quenching and selected from the derivatives of tetra-alkyl-morpholine and of tetra-alkyl-pyrrolidine, respectively containing the groups (I) and (II):

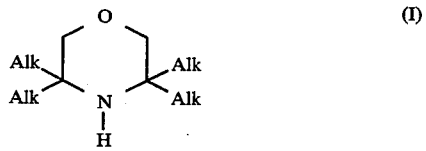

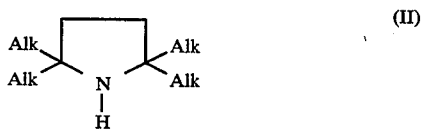

and the derivatives of tetra-alkyl-piperidine- containing the group (III)

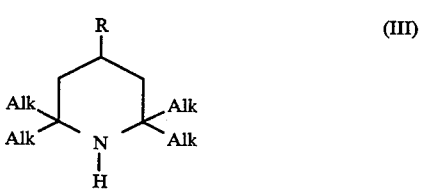

wherein R is a paraffinic polymeric chain, or a silyl-alkoxy group.

* * * * *

UNITED STATES PATENT AND TRADEMARK OFFICE
CERTIFICATE OF CORRECTION

PATENT NO. : 5,350,786
DATED : September 27, 1994
INVENTOR(S) : Silvestro COSTANZI, et al It is certified that error appears in the above-indentified patent and that said Letters Patent is hereby corrected as shown below:

On title page,

Item [63]  --Continuation of Ser. No. 803,739, Dec. 9, 1991, abandoned, which is a continuation of Ser. No. 532,112, Jun. 1, 1990, abandoned, which is a continuation of Ser. No. 078,663, July 28, 1987, abandoned.--

Item [30]  --Foreign Application Priority Data

July 30, 1986 [IT] Italy 21312 A/86--

Signed and Sealed this

Twentieth Day of December, 1994

Attest:

BRUCE LEHMAN

Attesting Officer

Commissioner of Patents and Trademarks